(12) United States Patent
Doi

(10) Patent No.: US 8,271,185 B2
(45) Date of Patent: Sep. 18, 2012

(54) VEHICLE

(75) Inventor: Katsunori Doi, Tokyo (JP)

(73) Assignee: Kabushikikaisha Equos Research (JP)

( * ) Notice: Subject to any disclaimer, the term of this patent is extended or adjusted under 35 U.S.C. 154(b) by 396 days.

(21) Appl. No.: 12/516,880

(22) PCT Filed: Nov. 2, 2007

(86) PCT No.: PCT/JP2007/071385
§ 371 (c)(1),
(2), (4) Date: Jun. 9, 2009

(87) PCT Pub. No.: WO2008/065853
PCT Pub. Date: Jun. 5, 2008

(65) Prior Publication Data
US 2010/0063719 A1   Mar. 11, 2010

(30) Foreign Application Priority Data
Nov. 30, 2006   (JP) .................................. 2006-324352

(51) Int. Cl.
*G06F 17/10* (2006.01)
(52) U.S. Cl. .......................... 701/124; 180/165; 700/245
(58) Field of Classification Search .................. 701/124; 180/165, 280; 700/245
See application file for complete search history.

(56) References Cited

U.S. PATENT DOCUMENTS

| | | | |
|---|---|---|---|
| 6,789,640 B1 * | 9/2004 | Arling et al. | 180/282 |
| 7,004,271 B1 * | 2/2006 | Kamen et al. | 180/21 |
| 7,273,116 B2 * | 9/2007 | Kamen et al. | 180/21 |
| 7,635,041 B2 * | 12/2009 | Adachi | 180/218 |
| 7,649,331 B2 * | 1/2010 | Hosoda et al. | 318/568.12 |
| 7,690,447 B2 * | 4/2010 | Kamen et al. | 180/21 |
| 7,866,429 B2 * | 1/2011 | Ishii et al. | 180/218 |
| 2003/0036818 A1 * | 2/2003 | Hattori et al. | 700/245 |
| 2003/0184071 A1 * | 10/2003 | Tokumaru et al. | 280/758 |
| 2004/0162636 A1 * | 8/2004 | Hattori et al. | 700/245 |
| 2006/0097683 A1 * | 5/2006 | Hosoda et al. | 318/568.12 |
| 2006/0243499 A1 * | 11/2006 | Hosoda | 180/8.5 |
| 2008/0035395 A1 * | 2/2008 | Kamen et al. | 180/21 |
| 2008/0164083 A1 * | 7/2008 | Miki et al. | 180/165 |
| 2010/0030397 A1 * | 2/2010 | Tachibana et al. | 701/1 |

FOREIGN PATENT DOCUMENTS

| | | |
|---|---|---|
| JP | 2-68285 | 5/1990 |
| JP | 2004-129435 | 4/2004 |
| JP | 2004-276727 | 10/2004 |
| JP | 2005-145296 | 6/2005 |

\* cited by examiner

*Primary Examiner* — Helal A Algahaim
(74) *Attorney, Agent, or Firm* — Bacon and Thomas, PLLC

(57) ABSTRACT

The disclosed vehicle has posture control of an inverted pendulum which provides good riding comfort.
A balancer target position $\lambda^*$ (calculated value) is determined according to target acceleration $\alpha^*$ indicated by an occupant. Driving thrust $S_B$ of a balancer 134 is determined by state feedback control so that a current balance position $\lambda$ (measured value) becomes closer to the determined balancer target position $\lambda^*$, and the balancer 134 is driven. An output $\tau_W$ of a driving wheel actuator 52 is determined from the current balancer position $\lambda$ (measured value) resulting from driving of the balancer 134. Since a driving torque is determined from an actual position of the balancer 134, stable upright posture control can be implemented even in a transient state which lasts until the balancer 134 reaches the target position.

6 Claims, 8 Drawing Sheets

LINEAR MOVEMENT TYPE

ROTARY PENDULUM TYPE

ROTARY INVERTED PENDULUM TYPE

VEHICLE

TECHNICAL FIELD

The present invention relates to vehicles, and for example, to a vehicle using posture control of an inverted pendulum.

BACKGROUND ART

Vehicles using posture control of an inverted pendulum (hereinafter, simply referred to as inverted pendulum vehicles) have attracted attention. For example, a conveying apparatus of Patent Document 1 was proposed.

Patent Document 1: Japanese Patent Application Publication No. JP-A-2004-129435

The conveying apparatus proposed by Patent Document 1 is stopped or moved by controlling operation of a rotor by a control portion while detecting the balance state and the operation state of a housing by a sensor portion.

Posture control is performed by moving the weight (balancer) of a counterweight portion according to the tilt angle of a vehicle body and thus moving the center of gravity.

DISCLOSURE OF THE INVENTION

Problem to be Solved by the Invention

In the vehicle described in Patent Document 1, posture control is performed by moving the balancer back and forth. However, Patent Document 1 does not disclose a specific control method during acceleration and deceleration of the vehicle.

Accordingly, for example, when the vehicle is accelerated by moving the balancer forward and thus moving the center of gravity of the vehicle forward, a driving torque suitable for the position of the center of gravity or the balancer position needs to be applied to driving wheels. Otherwise, a vehicle body also needs to be tilted in order to maintain a dynamic balance of the vehicle.

Patent Document 1 therefore has a problem that the vehicle body is tilted during acceleration and deceleration, which impairs the riding comfort of an occupant.

It is therefore an object of the present invention to provide a vehicle using posture control of an inverted pendulum which provides good riding comfort to an occupant.

Means for Solving the Problem

The present invention provides a vehicle which includes: a driving wheel; a vehicle body pivotally supported by a rotation shaft of the driving wheel; a balancer provided so as to be movable relative to the vehicle body; an input device operable by a driver of the vehicle to output a command for a target acceleration; and a controller for determining a driving torque of the driving wheel and balancer thrust for moving the balancer, according to the commanded target acceleration. The above object is thus achieved.

In one preferred embodiment of the invention the balancer is structured so that a boarding portion forms a part of the balancer or the whole balancer.

In another embodiment the vehicle body is structured so that a boarding portion for placing a weight body thereon forms a part of the vehicle body, and the balancer is provided so as to be movable relative to the boarding portion.

In yet another embodiment of the invention the vehicle further includes a balancer position sensor for detecting a position of the balancer; and target position determining means for determining a target position of the balancer according to the obtained target acceleration, and wherein the controller determines the balancer thrust according to the determined balancer target position and the detected balancer position, and determines the driving torque according to the detected balancer position.

In another embodiment of the vehicle further includes: a balancer position sensor for detecting a position of the balancer, and wherein the controller determines the driving torque according to the commanded target acceleration, determines a balancer target position according to the determined driving torque, and determines the balancer thrust according to the determined balancer target position and the detected balancer position.

Effects of the Invention

In the present invention, a driving torque for driving wheels and balancer thrust for moving a balancer are determined according to target acceleration, whereby a dynamic balance of the vehicle is maintained between driving output and balancer output. As a result, a vehicle which provides good riding comfort to an occupant can be provided.

Figure 1:
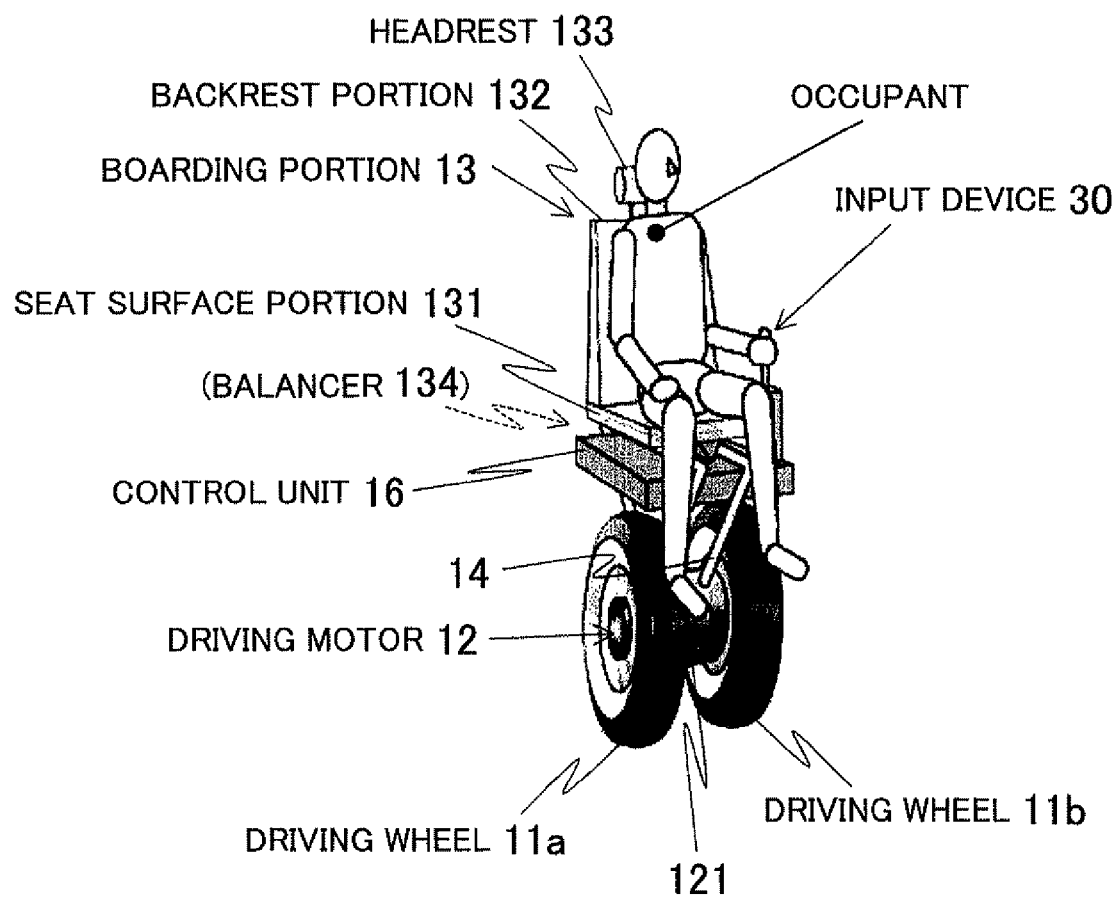
FIG. 1 is a structural diagram showing an appearance of a vehicle of an embodiment of the present invention.

DESCRIPTION OF THE REFERENCE NUMERALS 11 driving wheel
12 driving motor
13 boarding portion
131 seating surface portion
16 control unit
20 control ECU
21 main control ECU
22 driving wheel control ECU
23 balancer control ECU
31 acceleration/deceleration command device
41 angle meter
51 driving wheel rotation angle meter
52 driving wheel actuator
61 balancer driving motor rotation angle meter
62 balancer driving actuator

BEST MODES FOR CARRYING OUT THE INVENTION

Hereinafter, a preferred embodiment of a vehicle of the present invention will be described in detail with reference to FIGS. 1 through 8.

(1) Summary of the Embodiment

A vehicle body is subjected to the following three forces when a vehicle is accelerated and decelerated by moving a balancer:
- (a) a torque A due to an inertia force;
- (b) a reaction force (anti-torque) B of a driving torque; and
- (c) a vehicle body tilting torque C due to movement of a balancer.

It is necessary to determine the value of the driving torque so that these three forces are balanced, that is, so that A+B=C.

In the present embodiment, a boarding portion forms a part of the vehicle body. The balancer is a part of a vehicle body mass which does not include the boarding portion, and indicates a portion which can be moved freely in a direction perpendicular to the central axis of the vehicle body (a straight line extending through the center of gravity of the vehicle body and the center of rotation of the vehicle body) and the central axis of rotation of wheels by a balancer driving actuator mounted to the vehicle body.

The balancer of the present embodiment is positioned so as to be movable with respect to the vehicle body (boarding portion).

In the vehicle of the present embodiment, upright acceleration/deceleration by the balancer is implemented by the following method:

Upright acceleration/deceleration herein means that the vehicle is accelerated and decelerated without tilting the boarding portion.

In a first upright acceleration/deceleration process, acceleration and deceleration of the vehicle are implemented without tilting the vehicle body by moving the balancer to an appropriate position according to target acceleration (a balancer target position) and appropriately applying a driving torque of driving wheels according to an actual balancer position.

In the present embodiment, the driving torque is determined from the actual balancer position. Stable upright posture control can therefore be implemented even while the balancer is reaching the target position.

In a second upright acceleration/deceleration process, acceleration and deceleration of the vehicle is implemented without tilting the vehicle body by determining a driving torque according to target acceleration, determining a balancer target position according to the driving torque, and moving the balancer to the balancer target position.

In the present embodiment, the balancer target position is determined from the driving torque. Accordingly, the driving torque can be directly commanded, and acceleration intended by an occupant can be implemented.

In the present embodiment, an inverted type vehicle which provides good riding comfort to an occupant can be provided by implementing upright acceleration/deceleration by the balancer.

In other words, the following effects can be provided: (a) there is no significant change in occupant's field of view; (b) the occupant can directly feel acceleration and deceleration of the vehicle without any sense of discomfort; (c) there is no posture change at the beginning of acceleration and deceleration, which does not give the occupant any sense of discomfort; and (d) since a movable portion has a small inertia force, a time lag between acceleration command input from the occupant and actual acceleration of the vehicle is small.

(2) Details of the Embodiment

FIG. 1 shows a structural example of an appearance of the vehicle of the present embodiment.

As shown in FIG. 1, the vehicle includes two driving wheels 11a, 11b which are positioned coaxially.

Both driving wheels 11a, 11b are driven by a driving motor 12.

A boarding portion 13 (seat) which a weight body, such as a load and an occupant, boards is positioned above the driving wheels 11a, 11b (hereinafter, the term "driving wheels 11" is used to indicate both driving wheels 11a, 11b; the same applies to other structures) and the driving motor 12.

The boarding portion 13 is formed by a seat surface portion 131 on which a driver sits, a backrest portion 132, and a headrest 133.

The boarding portion 13 is supported by a support member 14 fixed to a driving motor housing 121 in which the driving motor 12 is accommodated.

An input device 30 is positioned on the left side of the boarding portion 13. The input device 30 is a device which is operated by the driver to give a command such as acceleration, deceleration, turn, rotation in place, stopping, braking, and the like.

The input device 30 of the present embodiment is fixed to the seat surface portion 131. However, the input device 30 may be formed by a wired or wireless remote controller. An armrest may be provided and the input device 30 may be provided on the armrest.

The input device 30 is provided in the vehicle of the present embodiment. However, in the case of a vehicle which runs automatically according to predetermined running command data, a running command data obtaining portion is provided instead of the input device 30. For example, the running command data obtaining portion may be formed by read means for reading running command data from various storage media such as a semiconductor memory or/and communication control means for obtaining running command data from outside by wireless communication.

Note that FIG. 1 shows the case where a human being boards the boarding portion 13. However, the present invention is not limited to a vehicle which is driven by a human being. In the present invention, the vehicle having only a load thereon may be run or stopped by external operation of a remote controller or the like, the vehicle having only a load thereon may be run or stopped according to running command data, or the vehicle with nothing thereon may be run or stopped.

In the present embodiment, control such as acceleration and deceleration is performed by an operation signal which is output by operation of the input device 30. However, a driver may change a forward tilting moment to the vehicle and a tilt angle in a longitudinal direction to perform posture control and running control of the vehicle according to the tilt angle. Alternatively, a vehicle capable of switching between the above two methods is also possible.

Although not shown in the figure, a balancer (weight body) 134, which will be described later, is provided between the boarding portion 13 and the driving wheels 11. The balancer 134 is structured so as to be movable in the longitudinal direction (the direction which is perpendicular to the axle on a horizontal plane when the vehicle body stands upright) by a balancer drive actuator 62.

A control unit 16 is provided between the boarding portion 13 and the driving wheels 11.

In the present embodiment, the control unit 16 is mounted to the lower surface of the seat surface portion 131 of the boarding portion 13. However, the control unit 16 may be mounted to the support member 14.

Figure 2:
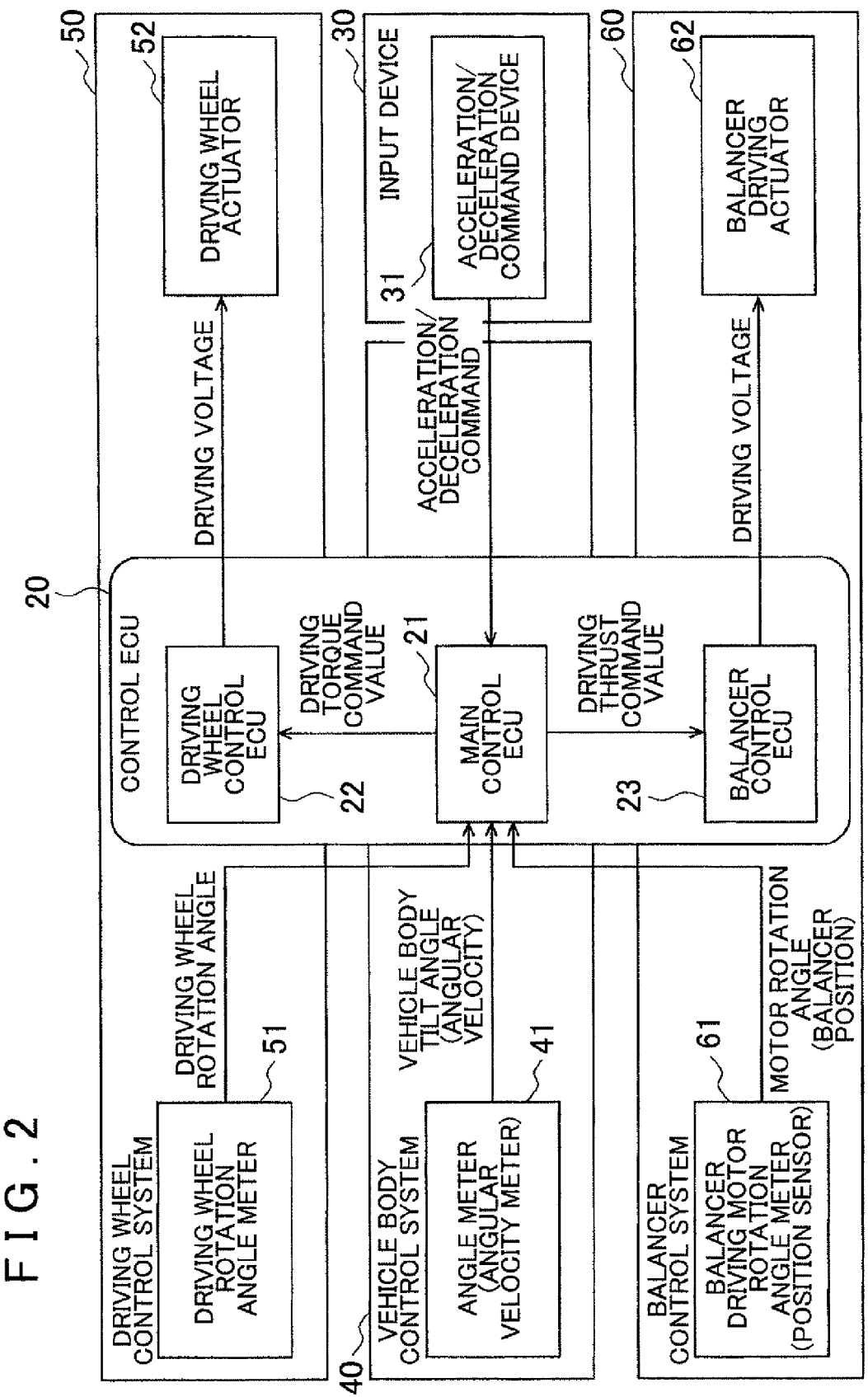
FIG. 2 is a structural diagram of a control unit.

FIG. 2 shows a structure of the control unit 16.

The control unit 16 includes a control ECU (Electronic Control Unit) 20, an acceleration/deceleration command device 31, an angle meter (angular velocity meter) 41, a driving wheel rotation angle meter 51, a driving wheel actuator 52, a balancer driving motor rotation angle meter 61 functioning as a balancer position sensor, the balancer driving actuator 62, and other devices.

The control unit 16 includes a battery as one of other devices. The buttery supplies driving and control electric power to the driving motor 12, the driving wheel actuator 52, the balancer driving actuator 62, the control ECU 20, and the like.

The control ECU 20 includes a main control ECU 21, a control ECU 20, and a balancer control ECU 23, and performs various controls such as running of the vehicle and posture control by performing driving wheel control, vehicle body control, balancer control, and the like.

The control ECU 20 is formed by a computer system which includes a ROM in which various programs and data, such as an upright acceleration/deceleration processing program to be performed by the balancer in the present embodiment, are stored, a RAM which is used as a work area, an external storage device, an interface portion, and the like.

The acceleration/deceleration command device 31, the driving wheel rotation angle meter 51, the angle meter (angular velocity meter) 41, and the balancer driving motor rotation angle meter (position sensor) 61 are connected to the main control ECU 21.

The acceleration/deceleration command device 31 is connected to the main control ECU 21 as the input device 30.

The acceleration/deceleration command device 31 supplies an acceleration/deceleration command based on operation of the input device 30 by the occupant to the main control ECU 21.

The input device 30 includes a joystick. The joystick is in a neutral position when the joystick stands upright. Acceleration and deceleration are commanded by tilting the joystick forward and backward, and right turn and left turn are commanded by tilting the joystick to the right and left. Required acceleration/deceleration and required turning curvature increase with the tilt angle.

The main control ECU 21 functions as a vehicle body control system 40 together with the angle meter 41. As posture control of an inverted vehicle, the main control ECU 21 performs posture control of the vehicle body by an anti-torque of the driving wheels, based on a tilted state of the vehicle body.

The main control ECU 21 functions as a driving wheel control system 50 together with the driving wheel control ECU 22, the driving wheel rotation angle meter 51, and the driving wheel actuator 52.

The driving wheel rotation angle meter 51 supplies a rotation angle of the driving wheels 11 to the main control ECU 21. The main control ECU 21 supplies a driving torque command value to the driving wheel control ECU 22. The driving wheel control ECU 22 supplies a driving voltage to the driving wheel actuator 52 as a driving command value.

The driving wheel actuator 52 controls driving of both driving wheels 11a, 11b independently according to a command value.

The main control ECU 21 functions as a balancer control system 60 together with the balancer control ECU 23, the balancer driving motor rotation angle meter 61, and the balancer driving actuator 62.

The balancer driving motor rotation angle meter 61 supplies a motor rotation angle corresponding to a balancer position to the main control ECU 21. The main control ECU 21 supplies a driving thrust command value to the balancer control ECU 23. The balancer control ECU 23 supplies a driving voltage to the balancer driving actuator 62 as a driving thrust command value.

FIG. 3 shows structural examples of a balancer moving mechanism for moving the balancer 134 to a balancer target position $\lambda_2^*$.

The balancer moving mechanism functions as weight-body moving means, and moves the center of gravity of the vehicle excluding a driving portion (the driving motor and the driving wheels) by moving the balancer 134 in the longitudinal direction.

The balancer moving mechanism is structured so as to move the balancer 134 provided under the seat surface portion 131 of the boarding portion 13 in the longitudinal direction.

Figure 3A:
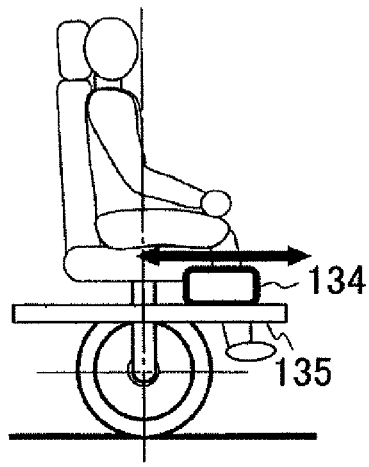
FIG. 3 shows illustrations of structural examples of a balancer moving mechanism.

The balancer moving mechanism of FIG. 3A according to the present embodiment translates the balancer 134 on a slider by a slider-type actuator 135.

Figure 3B:
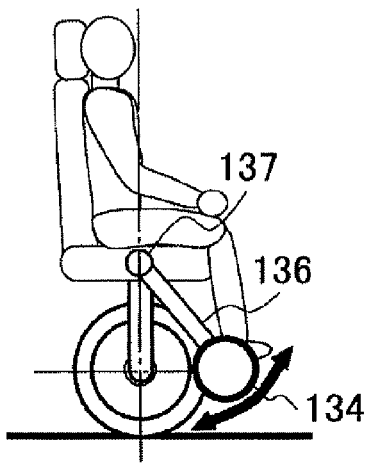
Figure 3C:
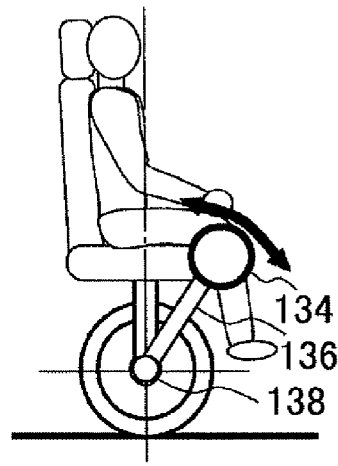

The balancer moving mechanisms shown in FIGS. 3B and 3C are mechanisms using a rotary movement type balancer. The balancer 134 is provided at one end of a support shaft 136, and respective rotors of balancer support shaft rotation motors 137, 138 are fixed to the other end of the support shaft 136.

The balancer 134 is moved by the balancer support shaft motors 137, 138 along a circumferential orbit having the support shaft 136 as a radius.

In the balancer moving mechanism of FIG. 3B, the balancer support shaft rotation motor 137 is provided under the seat surface portion 131, and the balancer 134 moves along the lower side of the circumferential orbit.

In the balancer moving mechanism of FIG. 3C, the balancer support shaft rotation motor 138 is provided coaxially with the driving wheels 11, and the balancer 134 moves along the upper side of the circumferential orbit.

Note that, as another example of the balancer moving mechanism, the balancer 134 may be moved by a retractable actuator.

For example, respective one ends of two retractable actuators are fixed to the front and the rear of the vehicle, and respective other ends thereof are fixed to the balancer 134. The balancer 134 is translated by extending one of the retractable actuators and retracting the other.

Upright acceleration/deceleration processing by the balancer in the vehicle having the above structure will now be described.

Figure 4:
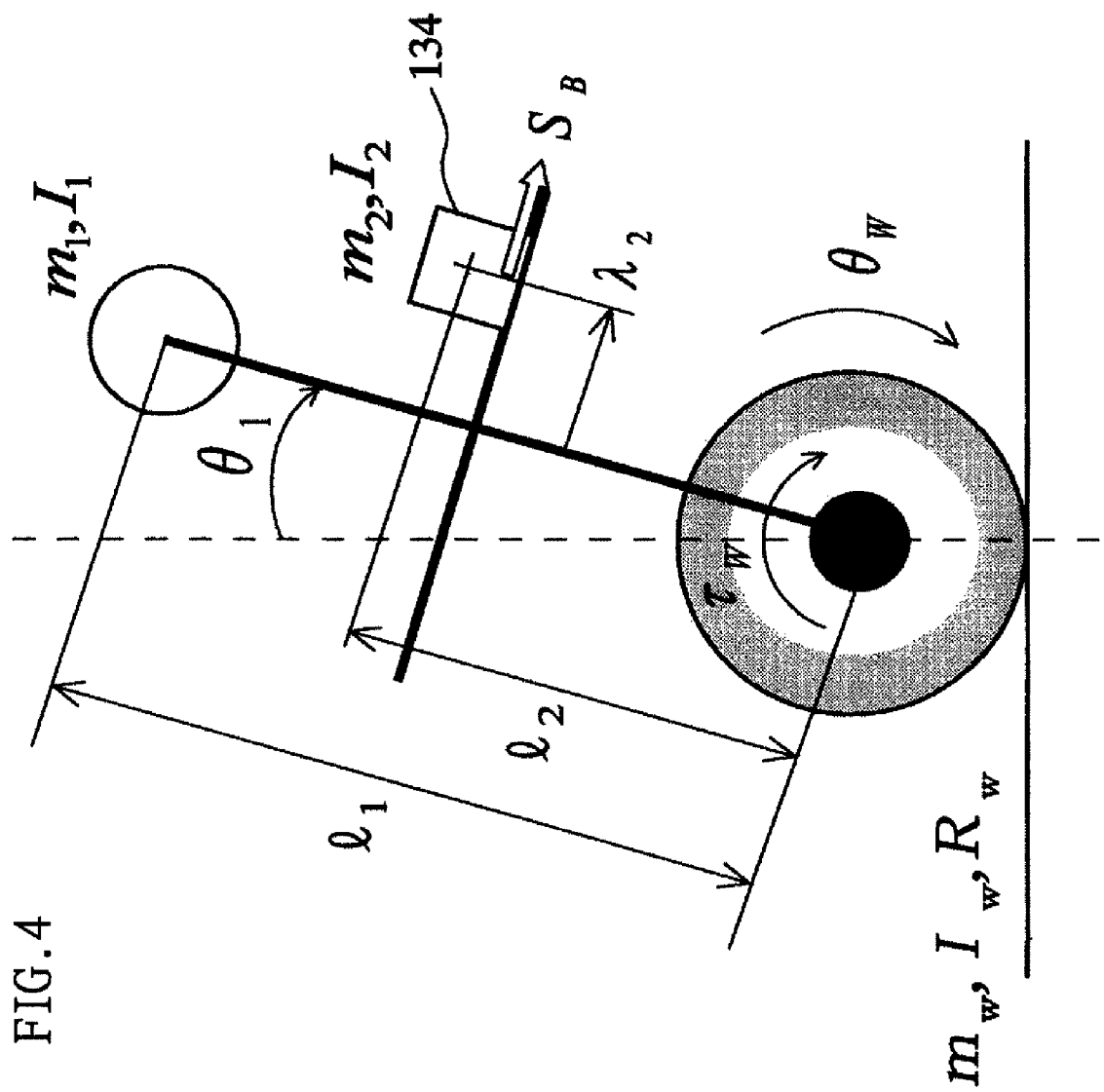
FIG. 4 is an illustration of a dynamic model of a vehicle posture control system in upright acceleration/deceleration processing by a balancer of the embodiment.

FIG. 4 shows a dynamic model of a vehicle posture control system in the upright acceleration/deceleration processing by the balancer of the present embodiment.

The balancer 134 in FIG. 4 is a weight body for performing posture control of the vehicle. FIG. 4 shows the case of FIG. 3A in which the balancer 134 moves in a direction perpendicular to the axle and the central axis of the vehicle.

Note that, as shown in FIGS. 3B and 3C, in the case where the balancer 134 moves along the circumferential orbit about the balancer support shaft rotation motors 137, 138, conversion based on the angle of the support shaft 136 or conversion to the angle of the support shaft 136 is performed.

The symbols shown in FIG. 4 are as follows:
(a) State Quantities
$\theta_W$: a rotation angle of tires [rad]
$\theta_1$: a tilt angle of a main body (from the vertical axis) [rad]
$\lambda_2$: a balancer position (from the central point of the vehicle body) [m]
(b) Input
$\tau_W$: a driving motor torque (the sum of two wheels) [Nm]
$S_B$: a balancer driving force [N]
(c) Physical Constant
g: gravitational acceleration [m/s$^2$]
(d) Parameters
$m_W$: mass of the tires [kg]
$R_W$: a radius of the tires [m]
$I_W$: a moment of inertia of the tires (around the axle) [kgm$^2$]
$m_1$: mass of the main body (including an occupant) [kg]
$l_1$: the distance of the center of gravity of the main body (from the axle) [m]
$I_1$: a moment of inertia of the main body (around the center of gravity) [kgm$^2$]
$m_2$: mass of the balancer [kg]
$l_2$: a reference distance of the center of gravity of the balancer (from the axle) [m]
$I_1$: a moment of inertia of the balancer (around the axle) [kgm$^2$]

Figure 5:
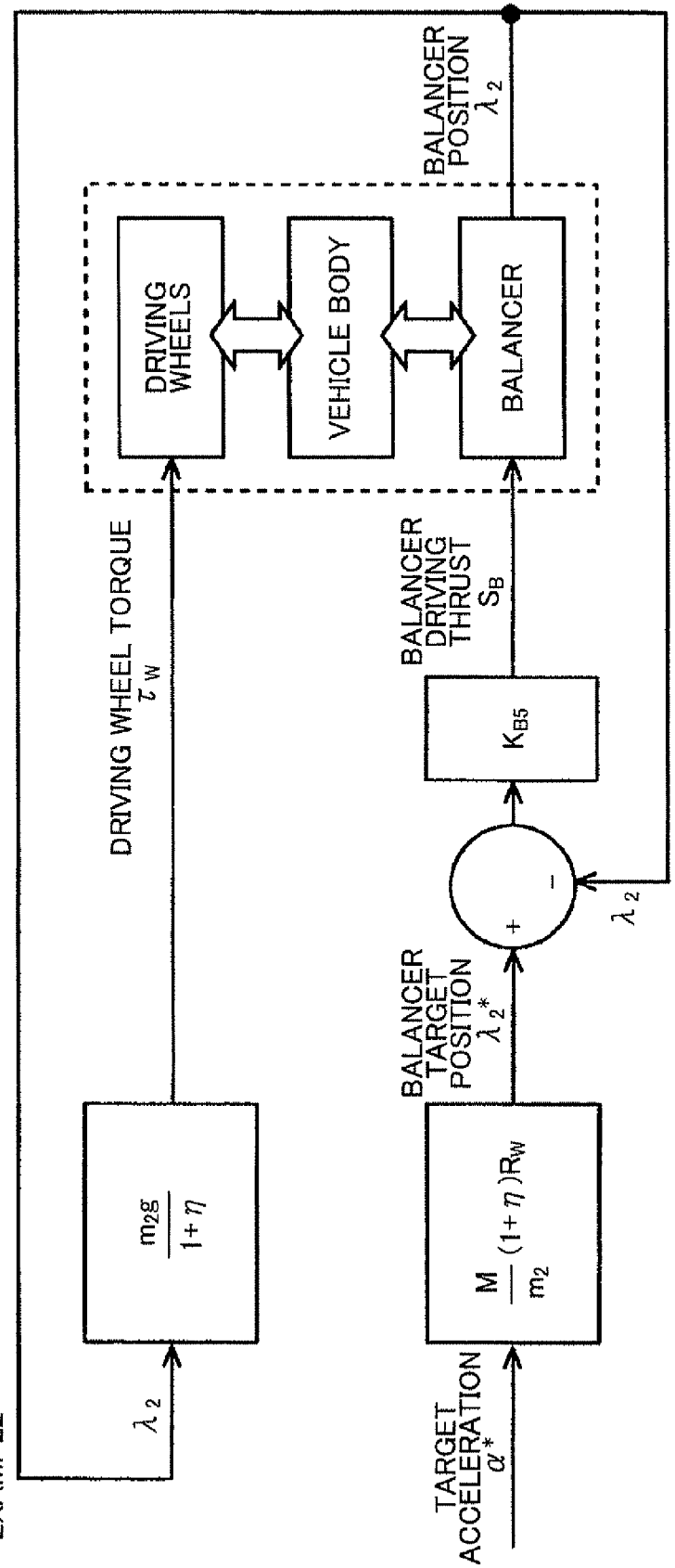
FIG. 5 is a block diagram showing an outline of a first upright acceleration/deceleration process by the balancer.
Figure 6:
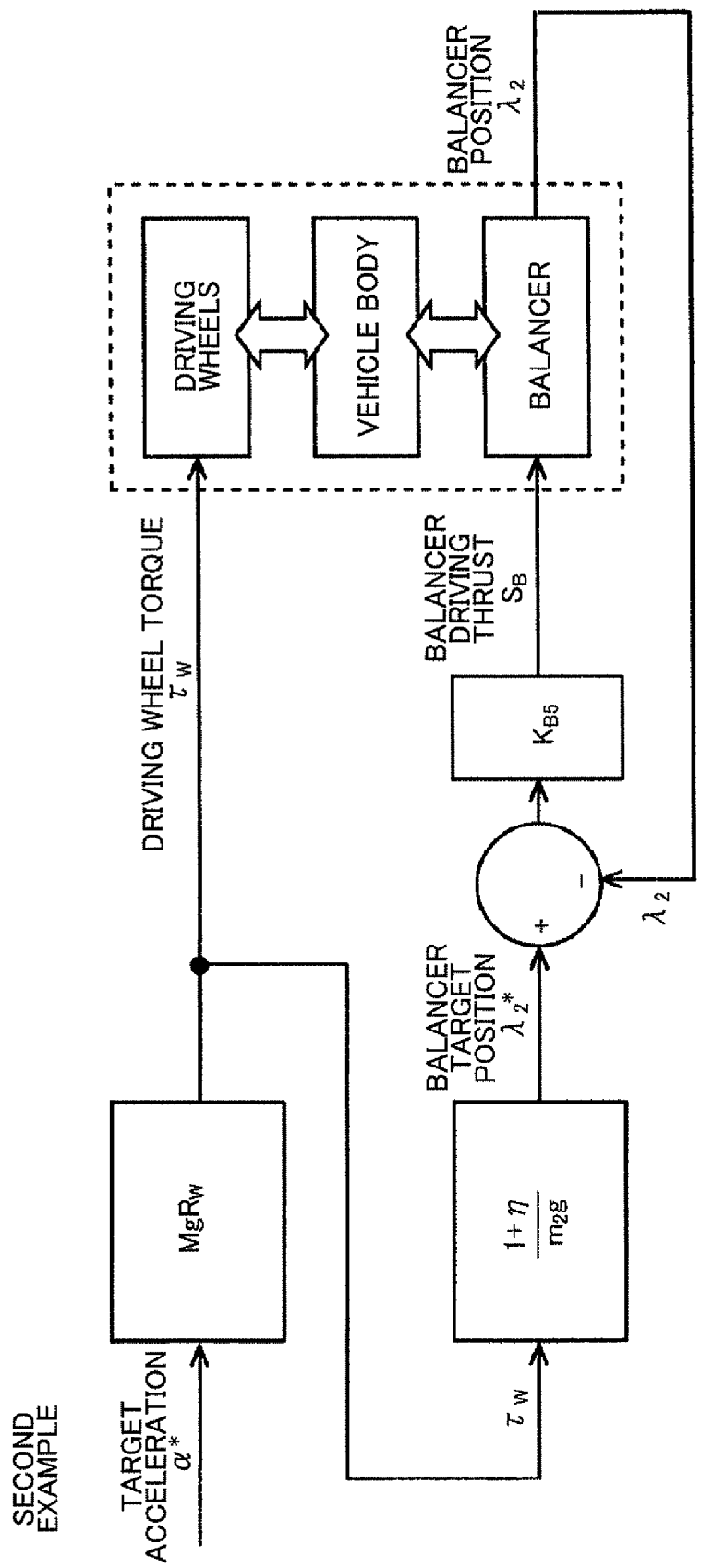
FIG. 6 is a block diagram showing an outline of a second upright acceleration/deceleration process by the balancer.

FIGS. 5 and 6 show outlines of the first and second upright acceleration/deceleration processes by the balancer.

In the first acceleration/deceleration process, a driving torque is determined from a measured actual position of the balancer 134.

More specifically, as shown in FIG. 5, a balancer target position $\lambda^*$ (calculated value) is determined according to target acceleration $\alpha^*$ indicated by the occupant. Driving thrust $S_B$ of the balancer 134 is determined by state feedback control so that a current balance position $\lambda$ (measured value) becomes closer to the determined balancer target position $\lambda^*$, and the balancer 134 is driven.

An output $\tau_W$ of the driving wheel actuator 52 is determined from the current balancer position $\lambda$ (measured value) resulting from driving of the balancer 134.

According to the first upright acceleration/deceleration process, a driving torque is determined from an actual position of the balancer 134. Therefore, stable upright posture control can be implemented even in a transient state which lasts until the balancer 134 reaches the target position.

In the second upright acceleration/deceleration process, on the other hand, a target position $\lambda_2^*$ of the balancer 134 is determined from a driving torque.

More specifically, as shown in FIG. 6, a driving wheel actuator output $\tau_W$ is determined according to target acceleration $\alpha^*$ indicated by the occupant, and a balancer target position $\lambda_2^*$ is determined according to the driving wheel actuator output $\tau_W$.

Driving thrust $S_B$ of the balancer 134 is determined by state feedback control so that a current balancer position $\lambda$ (measured value) becomes the determined balancer target position $\lambda^*$, and the balancer 134 is driven.

According to the second upright acceleration/deceleration process, a target position $\lambda_2^*$ of the balancer 134 is determined from a driving torque. Since the driving torque can be directly commanded, acceleration intended by the occupant can be implemented.

Figure 7:
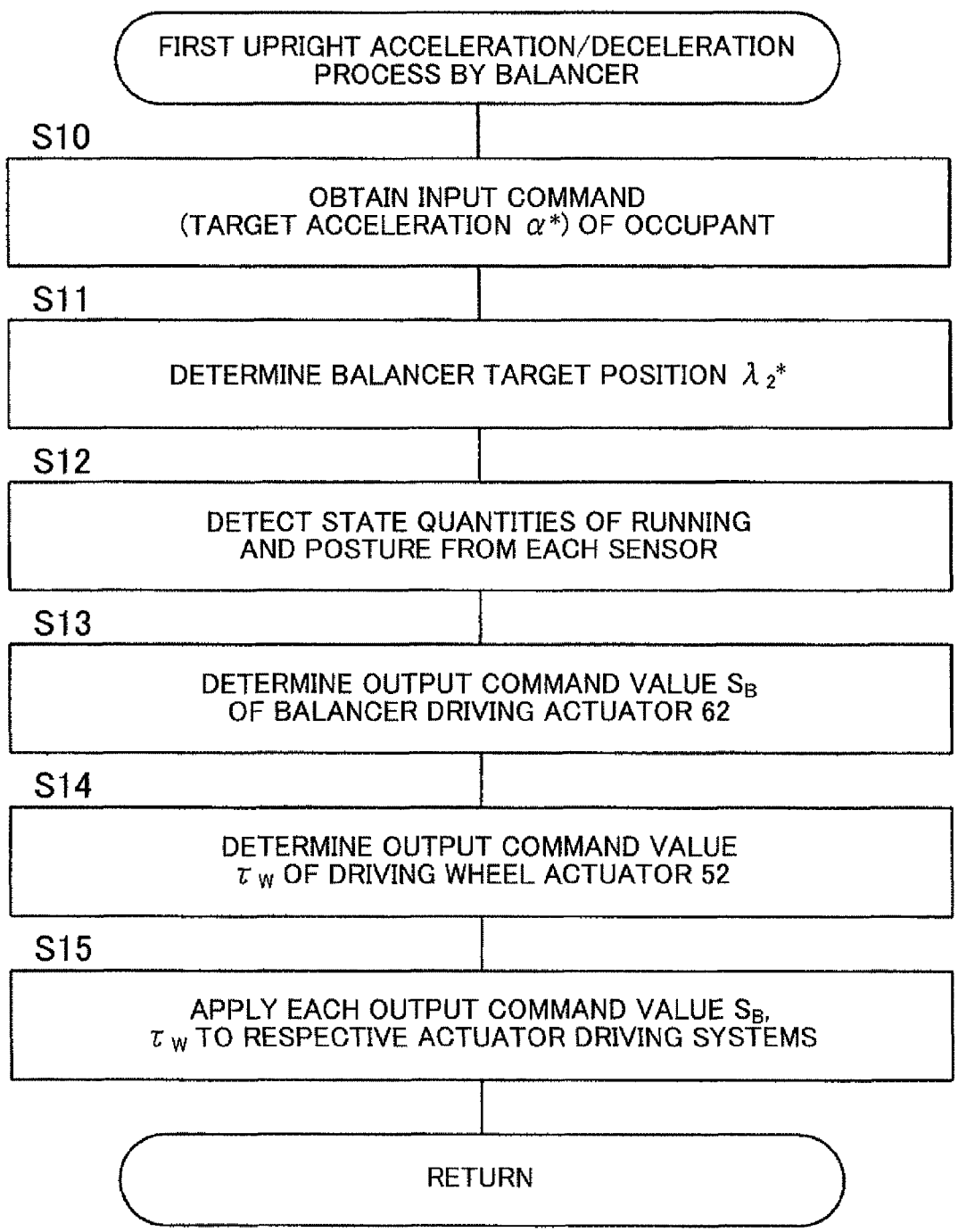
FIG. 7 is a flowchart showing the contents of the first upright acceleration/deceleration process by the balancer.

FIG. 7 is a flowchart illustrating the contents of the first upright acceleration/deceleration process by the balancer.

First, the main control ECU 21 obtains an input command (target acceleration $\alpha^*$) of the occupant (step 10).

For example, the target acceleration $\alpha^*$ is determined in the main control ECU 21 by obtaining an operation amount of the joystick by the occupant and using a predetermined function or an operation amount-target acceleration map according to the value of the operation amount.

It should be noted that the target acceleration $\alpha^*$ according to the operation amount may be determined based on a function or a map in the acceleration/deceleration command device 31 of the input device 30 and supplied to the main control ECU 21, and the main control ECU 21 may obtain the supplied target acceleration $\alpha^*$.

Note that, in the present embodiment, the target acceleration $\alpha^*$ is applied as an operation input. However, a target speed or a target driving torque may be applied and converted to target acceleration $\alpha^*$. In this case, conversion to the target acceleration $\alpha^*$ may be performed either by the main control ECU 21 or the input device 30.

The main control ECU 21 then determines a target position $\lambda_2^*$ of the balancer 134 according to the obtained target acceleration $\alpha^*$ by the following expression (1) (step 11).

Note that $\eta$ and M in the expression (1) are defined by the following expressions (2) and (3).

$$\lambda_2^* = (M/m_2)(1+\eta)R_W\alpha^* \quad \text{(Expression 1)}$$

$$\eta = (m_1 l_1 + m_2 l_2)/(MR_W) \quad \text{(Expression 2)}$$

$$M = m_1 + m_2 + m_W + I_W/R_W^2 \quad \text{(Expression 3)}$$

When both sides of the expression (1) are multiplied by the weight $m_2g$ of the balance; the left side, $\lambda_2^* m_2 g$, indicates a vehicle body tilting torque C caused by movement of the center of gravity of the balancer 134.

The first term of the right side, $MR_W\alpha^*g$, indicates an anti-torque B of a driving torque, and the second term of the right side, $M_\eta R_W\alpha^*g$, indicates a torque A due to an inertia force.

The expression 1 indicates a balanced state of the torque A of the inertia force, the anti-torque B of the driving torque, and the vehicle body tilting torque C.

The main control ECU 21 then detects state quantities of running and posture from each sensor (step 12).

More specifically, the ECU 21 obtains a vehicle body tilt angle (angular velocity) from the angle meter 41, a driving wheel rotation angle (rotation angle velocity) from the driving wheel rotation angle meter 51, and a position of the balancer 134 (a rotation angle of the balancer support shaft rotation motor 137, 138) from the balancer driving motor rotation angle meter 61.

The main control ECU 21 then determines an output command value of the balancer driving actuator 62 according to the balancer target position $\lambda_2^*$ determined in step 11 and the balancer position $\lambda_2$ obtained in step 12 (step 13).

More specifically, the main control ECU 21 determines an output command value (balancer driving thrust) $S_B$ of the balancer driving actuator 62 according to the following expression (4) indicating state feedback.

Note that { } in the expression 4 indicates a time derivative. For example, {n} indicates a time derivative of n.

$$S_B = -K_{B1}\theta_W - K_{B2}\{\theta_W\} - K_{B3}\theta_1 - K_{B4}\{\theta_1\} - K_{B5}(\lambda_2 - \lambda_2^*) - K_{B6}(\{\lambda_2\} - \{\lambda_2^*\}) \quad \text{(Expression 4)}$$

The main control ECU 21 determines an output command value (driving torque) $\tau_W$ of the driving wheel actuator 52 (step 14).

More specifically, the main control ECU 21 determines an output command value $\tau_W$ according to the current balancer position $\lambda_2$ obtained in step 12, by the following expression 5 which indicates an upright posture retaining torque and state feedback.

$$\tau_W = \tau_{W,0} - K_{W1}\theta_W - K_{W2}\{\theta_W\} - K_{W3}\theta_1 - K_{W4}\{\theta_1\} - K_{W5}(\lambda_2 - \lambda_2^*) - K_{W6}(\{\lambda_2\} - \{\lambda_2^*\}) \quad \text{(Expression 5)}$$

$$\tau_{W,0} = m_2 g \lambda_2/(1+\eta)$$

The main control ECU 21 then applies each output command value $S_B$, $\tau_W$ to the respective actuator driving systems (step 15), and returns to a main routine.

More specifically, the main control ECU 21 supplies the balancer driving thrust $S_B$ obtained in step 13 to the balancer control ECU 23, and supplies the command value of the driving torque $\tau_W$ obtained in step 14 to the driving wheel control ECU 22.

As a result, the balancer control ECU 23 controls the balancer driving actuator 62 with a driving voltage corresponding to the balancer driving thrust $S_B$, and the driving wheel control ECU 22 controls the driving wheel actuator with a driving voltage corresponding to the driving torque $\tau_W$. The vehicle is thus accelerated and decelerated while being maintained in an upright state.

Figure 8:
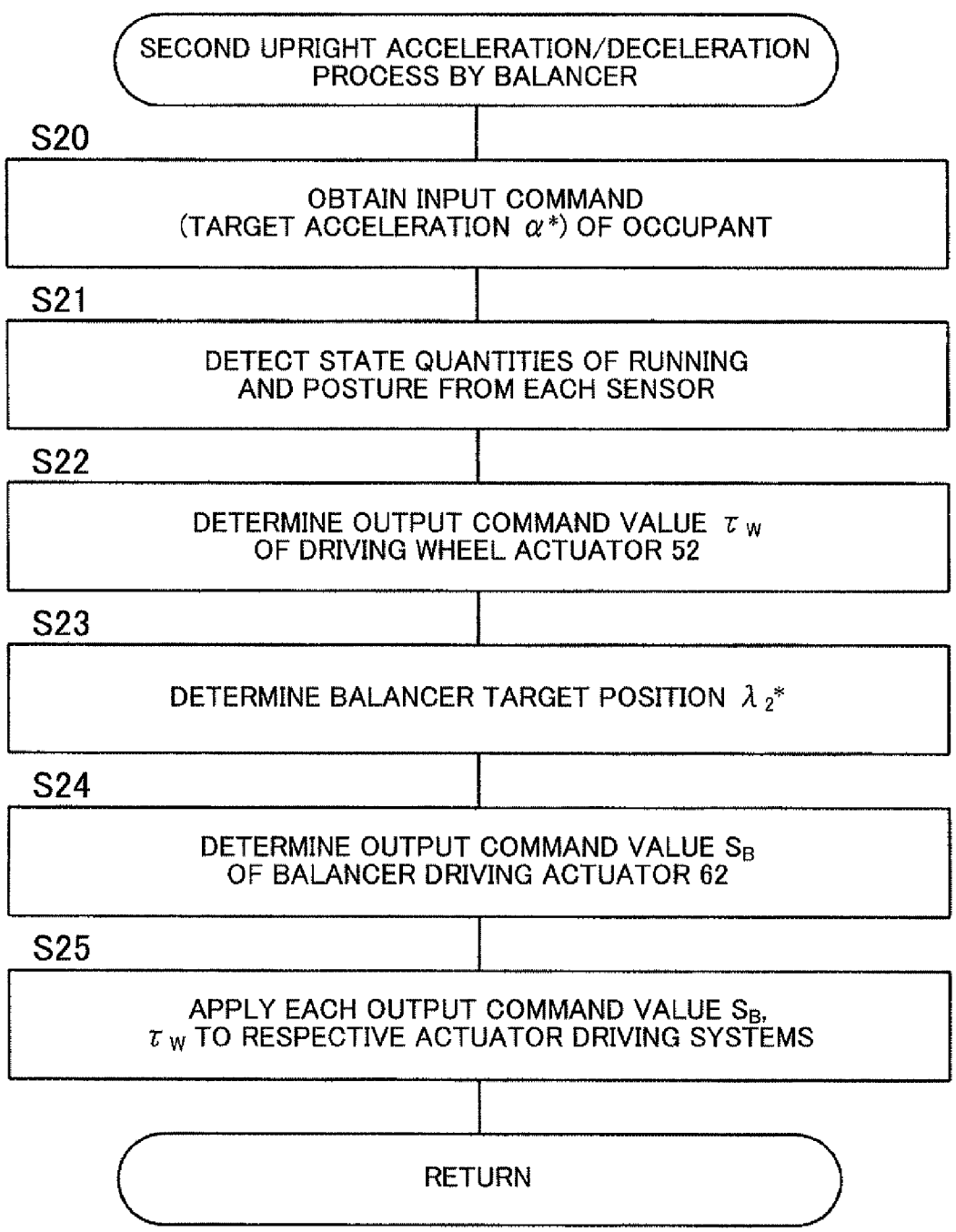
FIG. 8 is a flowchart showing the contents of the second upright acceleration/deceleration process by the balancer.

FIG. 8 is a flowchart illustrating the contents of the second upright acceleration/deceleration process by the balancer 134.

First, the main control ECU 21 obtains an input command (target acceleration $\alpha^*$) of the occupant (step 20), and detects state quantities of running and posture from each sensor (step 21).

The processing of step 20 is the same as that of step 10 in the first upright acceleration/deceleration process, and the processing of step 21 is the same as that of step 12 in the first upright acceleration/deceleration process.

The main control ECU 21 then determines an output command value (driving torque) $\tau_W$ of the driving wheel actuator 52 (step 22).

More specifically, the main control ECU 21 determines a driving torque $\tau_W$ according to the target acceleration $\alpha^*$ obtained in step 20, by the following expression (6) which indicates a vehicle acceleration/deceleration torque and state feedback.

$$\tau_W = \tau_{W,0} - K_{W1}\theta_W - K_{W2}\{\theta_W\} - K_{W3}\theta_1 - K_{W4}\{\theta_1\} \quad \text{(Expression 6)}$$

$$\tau_{W,0} = MgR_W\alpha^*$$

In the second upright acceleration/deceleration process, as shown in the expression 8, a current position $\lambda_2$ of the balancer 134 and a balancer target position $\lambda_2^*$ are not considered in determination of the driving torque $\tau_W$. In other words, the driving torque $\tau_W$ according to the target acceleration $\alpha^*$ is first determined regardless of the position of the balancer 134.

The main control ECU 21 then determines a balancer target position $\lambda_2^*$ for implementing upright posture according to the driving torque $\tau_W$ determined in step 22, by the following expression (7) (step 23).

Note that $\eta$ and M in the expression (7) are defined by the above expressions (2) and (3).

$$\lambda_2^* = (1+\eta)\tau_W/(m_2 g) \quad \text{(Expression 7)}$$

In the present embodiment, a command value is applied to $\tau_W$. However, an actual torque may be estimated from a driving current and a rotation speed of the driving motor 12, and applied to $\tau_W$. Alternatively, an actual torque may be estimated from a rotary motion state of the driving wheels by an observer.

The main control ECU 21 then determines an output command value $S_B$ of the balancer driving actuator 62 according to the balancer target position $\lambda_2^*$ determined in step 23 and the balancer position $\lambda_2$ obtained in step 21 (step 24).

The output command value $S_B$ is determined according to the above expression (4) which indicates state feedback.

The main control ECU 21 then applies each output command value $S_B$, $\tau_W$ to the respective actuator driving systems (step 255), and returns to a main routine.

More specifically, the main control ECU 21 supplies the command value of the driving torque $\tau_W$ obtained in step 22 to the driving wheel control ECU 22, and supplies the balancer driving thrust $S_B$ obtained in step 24 to the balancer control ECU 23.

As a result, the balancer control ECU 23 controls the balancer driving actuator 62 with a driving voltage corresponding to the balancer driving thrust $S_B$, and the driving wheel control ECU 22 controls the driving wheel actuator with a driving voltage corresponding to the driving torque $\tau_W$. The vehicle is thus accelerated and decelerated while being maintained in an upright state.

Note that, in the expressions (4), (5), and (6), K indicates a feedback gain, and for example, is preset based on the optimal regulator theory.

At least one of the values K may be set to zero depending on the purpose.

For example, in the expression (5) for obtaining an output command value $\tau_W$, the second term of the right side, $-K_{W1}\theta_W$, is a term serving to suppress rotation of the driving wheels. Therefore, this term is effective during stopping, but is not required during running during which the driving wheels are moving. Therefore, K may be set to $K_{W,1} \neq 0$, $K_{W,2} \neq 0$ during stopping in order to suppress movement of the vehicle, and may be set to $K_{W,1} = K_{W,2} = 0$ during running in order to make movement of the vehicle smooth.

Moreover, in the expressions (4), (5), and (6), various terms are added in order to calculate a more accurate value. However, the following expressions (8), (9), and (10) having the minimum required number of terms may be used instead of the expressions (4), (5), and (6), respectively.

$$S_B = -K_{B5}(\lambda_2 - \lambda_2^*) \quad \text{(Expression 8)}$$

$$\tau_W = \tau_{W,0} = m_2 g \lambda_2/(1+\eta) \quad \text{(Expression 9)}$$

$$\tau_W = \tau_{W,0} = MgR_W\alpha^* \quad \text{(Expression 10)}$$

In the illustrated embodiment, description was given to the case where the boarding portion forms a part of the vehicle body, and the first and second upright acceleration/deceleration processes are implemented by the balancer provided separately from the boarding portion. However, the balancer may be structured so as to include the boarding portion (or another weight body such as a control unit including the boarding portion, a battery, or the like).

In this case, the boarding portion is a part of the mass of the vehicle body, and the boarding portion functions as a balancer when being structured so as to be movable freely in a direction perpendicular to the central axis of the vehicle body (a straight line extending through the center of gravity of the vehicle body and the center of rotation of the vehicle body) and the central axis of rotation of the wheels.

In this case, posture control of the vehicle body which implements the first and second upright acceleration/deceleration is implemented by providing a moving mechanism for moving the boarding portion 13 functioning as a balancer, and using movement of the center of gravity caused by longitudinal movement of the boarding portion 13.

As the moving mechanism for moving the boarding portion 13, a low-resistance linear moving mechanism such as a linear guide device, for example, is used to control the relative positional relation between the boarding portion 13 and the support member 14 by the driving torque of a boarding portion driving motor.

The linear guide device includes a guide rail fixed to the support member 14, a slider fixed to the boarding portion driving motor, and a rolling body.

Two linear orbit grooves are formed on right and left side portions of the guide rail so as to extend along the longitudinal direction.

The slider has a U-shaped cross section along the width direction. Two orbit grooves are formed in the opposing inner surfaces of two side portions of the slider so as to face the orbit grooves of the guide rail, respectively.

The rolling body is inserted between the above orbit grooves, and rolls in the orbit grooves with relative linear motion between the guide rail and the slider.

Note that a return passage connecting both ends of the orbit grooves is formed in the slider so that the rolling body circulates in the orbit grooves and the return passage.

A brake (clutch) for fastening motion of the linear guide device is provided in the linear guide device. When operation of the boarding portion is not required, such as when the vehicle is stopped, the slider is fixed to the guide rail by the brake in order to retain the relative position between the support member 14 to which the guide rail is fixed and the boarding portion 13 to which the slider is fixed. When operation of the boarding portion is required, the brake is released to control the distance between the reference position of the support member 14 side and the reference position of the boarding portion 13 side to a predetermined value.

In the vehicle structured as described above, the boarding portion including the occupant is translated in the longitudinal direction of the vehicle so as to function as a balancer (the balancer 134 in the illustrated embodiment), whereby the first and second upright acceleration/deceleration is implemented.

Two balancers may be provided.

For example, a weight body movable relative to the vehicle body may be structured as a first balancer, and a boarding portion 13 movable relative to the vehicle body and the first balancer may be structured as a second balancer.

In this case, when the acceleration is low, the weight body as the first balancer may be used as the balancer 134 of the illustrated embodiment to implement upright acceleration/deceleration. When the acceleration is high and the first balancer reaches its movement limit, the boarding portion 13 as the second balancer may be moved as the balancer 134 of the illustrated embodiment so as to compensate for the shortage of the movement of the center of gravity, and upright acceleration/deceleration may be implemented in this manner.

Alternatively, the weight body as the first balancer may be moved according to high frequency components of acceleration/deceleration, and the boarding portion 13 as the second balancer may be moved according to low frequency components of acceleration/deceleration. Upright acceleration/deceleration control may be implemented in this manner.

The invention claimed is:

1. A vehicle comprising:
a driving wheel;
a vehicle body pivotally supported by a rotation shaft of the driving wheel;
a balancer provided so as to be movable relative to the vehicle body;
a balancer position sensor for detecting a position of the balancer;
an input device operable by a driver of the vehicle to output command for a target acceleration; and
a controller for determining a driving torque of the driving wheel and balancer thrust for moving the balancer, according to the commanded target acceleration, for outputting a command for the determined driving torque to a driving wheel actuator and for outputting a command for the determined balancer thrust to a balancer driving actuator, for determining a target position of the balancer according to the commanded target acceleration, for determining the balancer thrust according to the determined balancer target position and the detected balancer position, and for determining the driving torque according to the detected balancer position.

2. The vehicle according to claim 1, wherein:
a boarding portion forms a part of the balancer or the whole balancer.

3. The vehicle according to claim 1, wherein:
a boarding portion for placing a weight body thereon forms a part of the vehicle body, and
the balancer is movable relative to the boarding portion.

4. A vehicle comprising:
a driving wheel;
a vehicle body pivotally supported by a rotation shaft of the driving wheel;
a balancer provided so as to be movable relative to the vehicle body;
an input device operable by a driver of the vehicle to output command for a target acceleration;
a balancer position sensor for detecting a position of the balancer; and
a controller for determining a driving torque of the driving wheel and balancer thrust for moving the balancer, according to the commanded target acceleration, for outputting a command for the determined driving torque to a driving wheel actuator, for outputting a command for the determined balancer thrust to a balancer driving actuator, for determining the driving torque according to the commanded target acceleration, for determining a balancer target position according to the determined driving torque, and for determining the balancer thrust according to the determined balancer target position and the detected balancer position.

5. The vehicle according to claim 4, wherein:
a boarding portion forms a part of the balancer or the whole balancer.

6. The vehicle according to claim 4, wherein:
a boarding portion for placing a weight body thereon forms a part of the vehicle body, and
the balancer is movable relative to the boarding portion.

* * * * *

UNITED STATES PATENT AND TRADEMARK OFFICE
CERTIFICATE OF CORRECTION

| | | |
|---|---|---|
| PATENT NO. | : 8,271,185 B2 | Page 1 of 1 |
| APPLICATION NO. | : 12/516880 | |
| DATED | : September 18, 2012 | |
| INVENTOR(S) | : Katsunori Doi | |

It is certified that error appears in the above-identified patent and that said Letters Patent is hereby corrected as shown below:

Column 12, line 15 (Claim 1, line 14) "actuator and for" should read -- actuator, for --.

Signed and Sealed this

Thirteenth Day of November, 2012

David J. Kappos
*Director of the United States Patent and Trademark Office*